Jan. 12, 1932.   B. A. MALKIN   1,840,590
DRIVE FOR PAPER MAKING MACHINES
Filed March 29, 1930   3 Sheets-Sheet 1

INVENTOR
BERNARD.A.MALKIN
BY Fetherstonhaugh & Co
ATTORNEYS

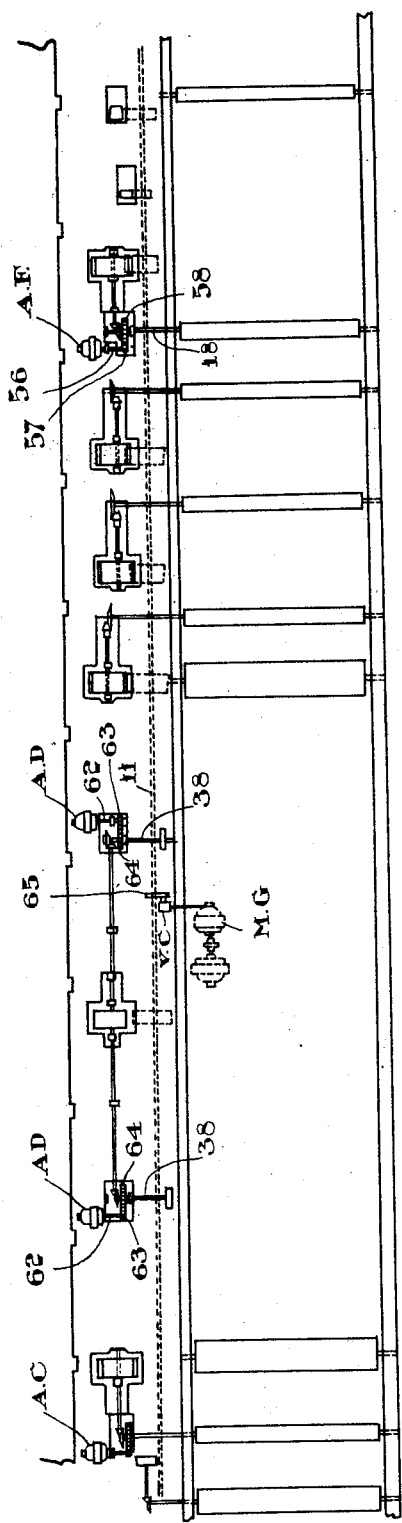

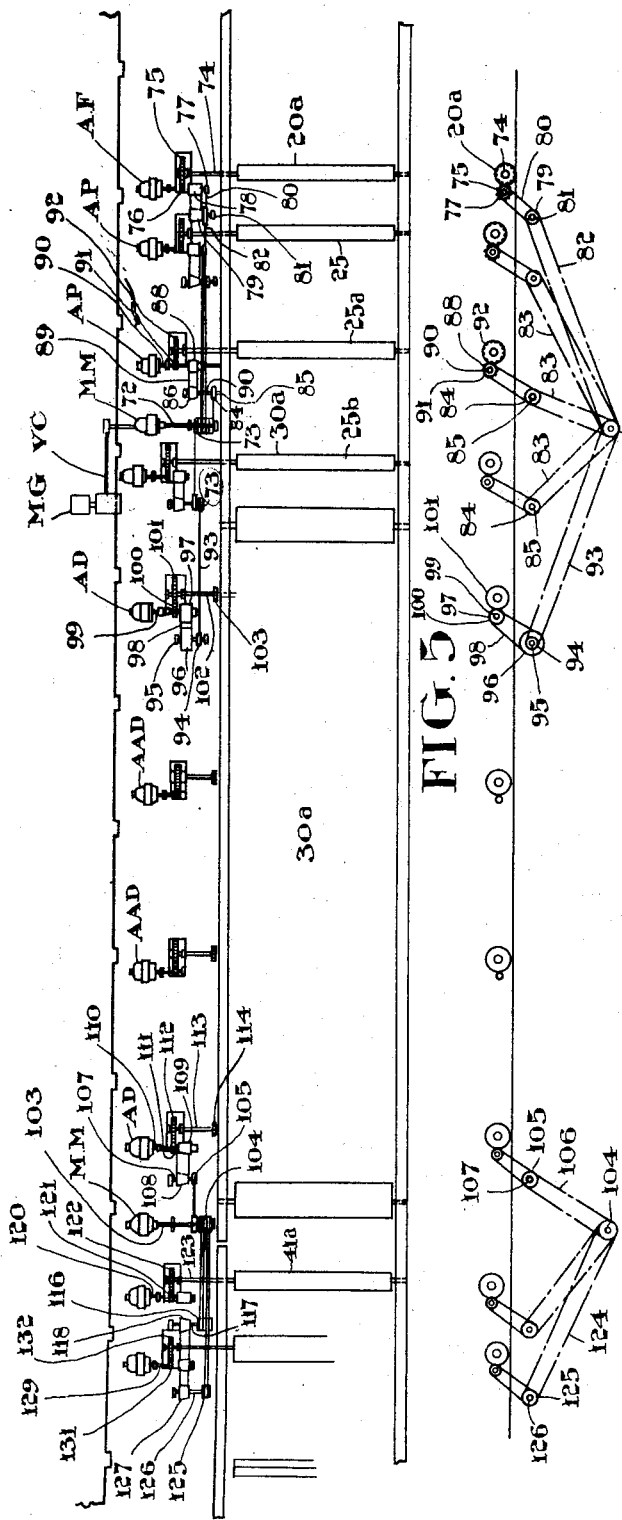

Patented Jan. 12, 1932

1,840,590

UNITED STATES PATENT OFFICE

BERNARD A. MALKIN, OF LACHINE, QUEBEC, CANADA

DRIVE FOR PAPER MAKING MACHINES

Application filed March 29, 1930. Serial No. 440,104.

This invention relates to new and useful improvements in paper making machines and particularly to the driving mechanism therefor and the object of the invention is to provide a drive for a paper making machine which will be without the electrical complications found in the majority of machines at present in use.

It has been found from experience that it is impractical to drive a modern high speed wide paper making machine entirely by mechanical means, owing to the power requirements of each section necessitating the use of high speed wide belts which must run on conical pulleys to take care of the independent sectional speed variation due to the draw or stretch of the paper. The contact of a wide belt on a cone pulley is only over a comparatively small portion of the width, resulting in slip and irregular speed of the driven section and consequent breakage of the paper.

To overcome the above mentioned difficulties is another object of my invention.

According to this invention, the usual mechanical drive is supplemented by an electric motor drive, to each section, each motor having suitable characteristics to control the machine speed. The motors reduce the power required by the main mechanical drive and allow narrower belts and lighter gears to be used. Each motor may take any proportion of the power or sufficient load to relieve the mechanical drive to avoid belt slippage and consequent speed variation. The main mechanical drive must be able to take care of any variation in power to allow the motors to transmit constant power and, therefore, constant speed.

A very useful application of the invention is the application of the supplemental motors to each section of existing mechanically driven machines which have reached the limit of their speed owing to the limitation of their drive. The sectional motors receive their power from a source which controls the machine speed and the line shaft or main drive is controlled from the same source. There is no automatic individual control on the motors to cause them to run at uniform speed under varying power conditions as the mechanical drive functions as the controlling medium. Manual control of the sectional motors may be applied so that the proportion of load taken by them could be varied.

In the accompanying drawings, which illustrate various forms of my invention,

Figure 3 is a plan view of the drive shown in Figure 1 with booster motors on the couch, drier and calender.

Figure 4 is a plan view of a machine with booster motors on the couch, calender and segregated drier sections.

Figure 5 is a diagrammatic plan view of a belt driven machine with booster motors on the various sections.

Figure 6 is a side elevation of the machine shown in Figure 5.

Figure 1:
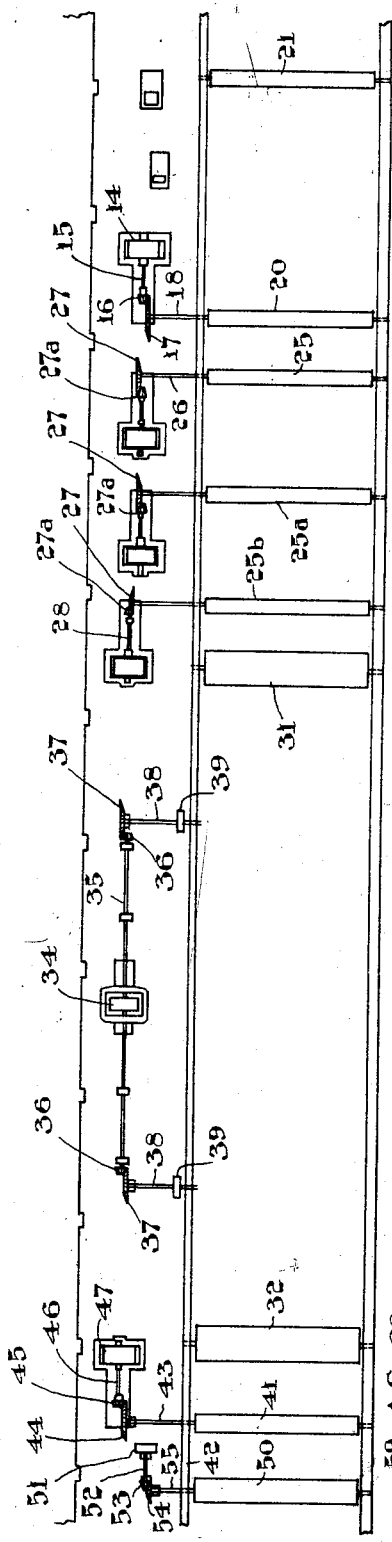
Figure 1 is a plan view showing one form of paper machine drive to which my improved sectional drive may be applied.

Referring more particularly to the drawings, 11 designates the main drive shaft which is driven from a source such as the motor M. This shaft is adapted to drive the various sections of the machine. The fourdrinier or wet end of the machine is driven through the medium of the cone pulley 12. Pulley 12 drives pulley 14 through a suitable belt and this pulley 14 is coupled to a shaft 15 having a bevel toothed pinion 16 meshing with a bevel toothed wheel 17 secured to the shaft 18 of the couch roll 20. The couch roll has an endless wire (not shown) which extends around the breast roll 21 in the usual manner. The usual fan and the shaker mechanism shown diagrammatically are driven from the pulleys 13 and 22, respectively, pulley 13 driving pulley 23 by a suitable belt, and pulley 22 driving pulley 24 by another belt. The first press roll 25 which is secured to the shaft 26 is driven through the co-acting bevel toothed wheel and pinion 27, said pinion being secured to a shaft 28 driven by pulleys 29 one of which is secured to the shaft 28 and the other secured to the main drive shaft, a belt forming the connection between the pulleys 29. The second and third press rolls 25a and 25b are driven from the main shaft by gearing similar to that driving the first press and the same numerals are used to designate the similar parts of each drive. The drier section 30 extends between the rolls 31 and 32. Positioned on the main shafting intermediate the drier rolls 31 and 32 is the belt pulley 33 which drives pulley 34 through suitable belting. The pulley 34 is secured intermediate the ends of a shaft 35 running in suitable bearings and provided with bevel pinions 36 at each end. These pinions mesh with bevel wheels 37 secured to the ends of driving spindles 38 which are provided with pinions 39 adapted each to mesh with one of a train of gears adapted to rotate the drier rolls which are secured to the drier roll spindles rotatably mounted in the frame 40. The above construction is shown only in diagrammatic form. The calender roll 41 is rotatably mounted on the frame 42 and has a shaft 43 extending outwardly therefrom to the end of which is secured a bevel toothed wheel 44 meshing with a bevel toothed pinion 45 secured to a small shaft 46. This shaft 46 is provided with a pulley 47 driven by a belt 48 and pulley 49a said pulley 49a being secured to the main driving shaft. The reel 50 is driven from the main shafts by means of pulleys and belting 51, one of said pulleys being secured to the main shaft while the other is secured to a shaft 52 to the end of which is secured a bevel toothed pinion 53 meshing with a bevel toothed wheel 54 secured to the shaft 55, which may be connected by gearing or directly to the winding reel 50.

Figure 2:
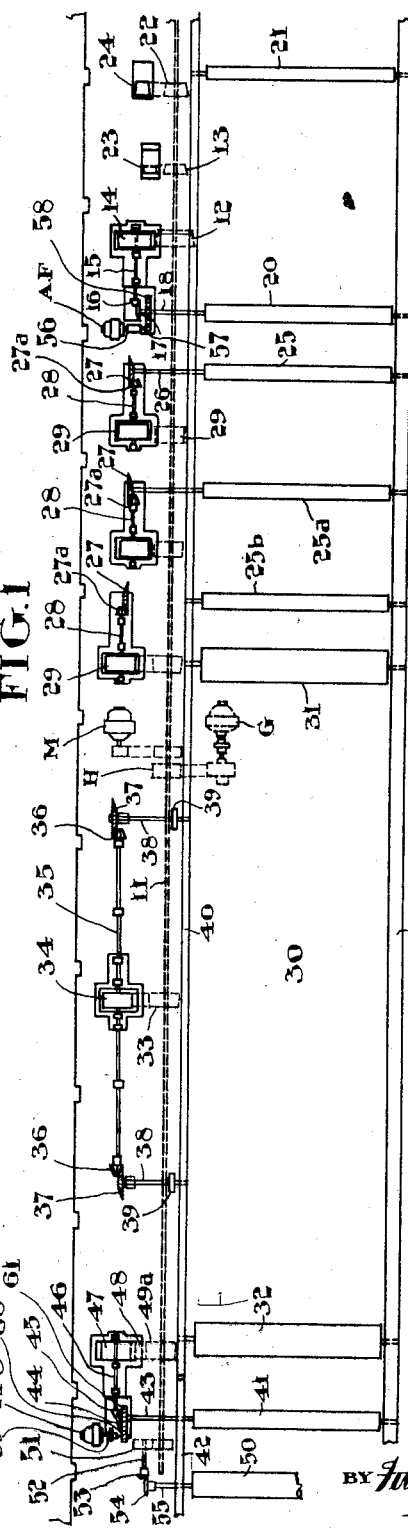
Figure 2 is a plan view of the same drive as depicted in Figure 1 with booster motors on the couch and the calender sections.

The foregoing is descriptive of the driving mechanism which may be called the mechanical drive as shown in Figure 2. The prime mover of the mechanical drive is shown as a motor M connected by any suitable means to drive the main shaft. In Figure 2, booster or auxiliary motors are shown on the fourdrinier and calender sections only. One of the booster motors AF is coupled to a shaft extension 56 having a toothed pinion 57 meshing with a toothed wheel 58 secured to the shaft 18. The other booster motor AC is coupled to a shaft extension 59 having a toothed pinion 60 meshing with a toothed wheel 61 secured to the shaft 43. The motors AF and AC are electrically connected to a generator G driven by pulleys H and suitable belting from the main shaft 11. It will be seen that the speed of the generator is regulated by the main shaft and, therefore, the voltage supply from the generator to the auxiliary motors depends on the speed of the main shaft. The motors AF and AC are, therefore, controlled indirectly from the main shaft and assist the main drive in the fourdrinier and calender sections, respectively. In the modification shown in Figure 3, additional motors are shown coupled to the drier section. The motors AD are coupled to shaft extensions 62 each having toothed pinions 63 meshing with tooth wheels 64 secured to the shafts 38. In this figure, a motor generator set MG is used for supplying current to the auxiliary or booster motors AF, AC and AD. A voltage control mechanism VC is shown driven from the main shaft 11 by means of pulleys and belting designated 65. The speed of the main shaft will control the voltage of the generator set and the booster motor speeds are regulated by the voltage supplied thereto by the generator, so that the speeds of the auxiliary or booster motors are dependent on the speed of the main shaft 11. In the mechanism shown in Figure 3 it will be seen that four extra motors are used to assist the main drive shaft in the driving of the machine.

In the mechanism shown in Figure 4, part of the main line shaft between the shafts 38 is removed and pinions 38a are secured to short shafts. These shafts are driven from the main shaft 11 by means of pulleys 67 and belts 66. In this modification, six auxiliary motors are shown, four of them coupled in the manner disclosed in Figure 3. The additional motors AAD are each coupled to a shaft extension 68 having a toothed pinion 69 meshing with a toothed wheel 70 secured to a shaft 71 which extends towards the drier section and is provided with means not shown for driving the drier rolls. The drier section shown in this figure is the well known segregated drier driving mechanism now commonly in use. The voltage regulator VC is coupled to one of the sections of the main shaft and this controls the voltage developed by the motor generator set MG which supplies current to the auxiliary or booster motor, thereby controlling the speed of same. The booster motors may receive their current from the same source as the current supply to the element driving the main shaft if this supply is adjustable.

In Figures 5 and 6, a belt or rope driven machine is shown. The mechanical driving motors MM and MM₁ are shown driving different sections of the machine. Motor MM is coupled directly to a shaft extension 72 and mounted on said shaft is the rope drum 73 having a plurality of grooves therein. The couch roll 20a has a spindle 74 which has secured thereto a toothed wheel 75 adapted to mesh with a pinion 76 secured to a shaft 77. This shaft has also a cone pulley 78 attached thereto, said pulley being driven from a pulley 79 by means of a belt 80. The pulley 79 is secured to a spindle 81 rotatably mounted in suitable bearings and provided with a grooved rope pulley adapted to receive the driving rope 82. The first press, second press and third press rolls designated 25, 25a and 25b in Figures 5 and 6 are driven by similar driving mechanism. One press drive is described but it will be applicable to each of the presses. Each press is driven by means of a rope 83, which passes around the rope drum 73 and around the rope pulley 84. The rope pulley 84 is secured to spindle 85 upon which is mounted a cone pulley 86 adapted to drive a spindle 87 through the cone pulley 88 and belt 89. The pulley 88 is secured to a shaft 90 having a toothed pinion 91 meshing with a toothed wheel 92 secured to the press roll spindle. The drier section 30a is of the usual segregated type and driven from the motors MM and $MM_1$. A rope 93 from the rope drum 73 passes around a rope pulley 94 secured to a spindle 95 upon which is mounted a cone pulley 96 driving cone pulley 97 through the medium of the belt 98. Cone pulley 97 is mounted on a shaft 99 having a toothed pinion 100 secured thereto and adapted to mesh with the toothed wheel 101 on the shaft 102. This shaft 102 has a pinion 103 at one end adapted to gear with one of a series of spur tooth wheels secured to the end of the drier roll spindles. The motor MM is directly coupled to a shaft 103a having a rope drum 104 secured thereto. This drum is grooved and adapted to drive part of the drier section, the calender section and the reel section of the machine. Extending around the drum 104 and adapted to drive the rope pulley 105 is the rope 106. The rope pulley is mounted on a shaft 107 to which is attached a cone pulley 108 adapted to be driven by a second cone pulley 109 secured to a spindle 110 by means of a belt. This spindle 110 has a toothed pinion 111 meshing with a toothed wheel 112 mounted on a spindle 113 having a pinion 114 adapted to mesh with one of the train of gearing for the drier section. To drive the calender section a rope 115 is passed partially around the rope drum 104 and also around the rope pulley 116 mounted on the spindle, 117. Secured to this spindle is the cone pulley 118 which is provided to drive cone pulley 119 secured to spindle 120. A toothed pinion 121 is secured to the spindle 120 and meshes with a toothed wheel 122 mounted on the spindle 123 of the calender roll 41a. A rope 124 passes around the rope drum and is adapted to drive the rope pulley 125 secured to the spindle 126. Also secured to the spindle 126 is the cone pulley 127 which drives the pulley 128 on the shaft 129 through the medium of the belt 130. A toothed pinion 131 is secured to the shaft 129 and meshes with a toothed wheel 132 secured to the reel roll spindle.

This drive is augmented by a plurality of auxiliary motors. The auxiliary motor AF is coupled directly to the shaft 77 for the fourdrinier section.

The motor AP is coupled to the shafts 90 to drive the press sections. The motors AD are coupled directly to the shafts 99 and 110 to augment the driving of the drier sections. The motors AAD intermediate the motors AD drive the pinions 133 which mesh with the wheels 134 secured to the spindle 135 having pinions 136, which each mesh with toothed wheels of the train of gears of the drier section. The auxiliary motor AC is coupled to the shaft 120 to assist in driving and regulating the rotation of the calender roll.

The auxiliary motor AR is coupled directly to the shaft 130 to assist in driving the reel roll.

In the case of the mechanism shown in Figures 5 and 6, the mechanical drive motors are assisted by the ten auxiliary motors. These auxiliary motors receive their power from the same source as the mechanical drive motors.

The foregoing description is directed to specific mechanically operated drives, but it will be readily understood that the supplemental or auxiliary electrical drive for one or more sections of the machine may be equally applied with the same results to one or more sections of machines having different types of main mechanical drives without departing from the spirit of the invention. It will be seen that in operation there is a common feature to all types of the machines herein disclosed, that is, they have a main mechanical driving unit or units adapted to drive the whole or a series of different sections of the machine and by supplementing the said drive or drives with auxiliary sectional electrical drives, the speed of the machine may be increased and the sizes of belts or other mechanism forming the connections between the mechanical drive and the sections comparatively reduced so that the tendency for the main connections to slip is reduced to a minimum and breakages in the paper sheet practically eliminated when the machine is run at high speeds. The booster motors receive their current from a source of supply, the voltage of which is controlled by the speed of the machine and, therefore, the speed of the said motors being controlled by the current supply is directly controlled by the mechanical drive without intricate connections usually employed in machines of this class.

The auxiliary motors are of sufficient power to start their respective sections of the machine and preferably the greatest amount of the load will be taken up by these motors. The best type of booster or auxiliary motor which can be used with this machine, is one in which the main characteristic produces a quickly dropping power speed curve so that small variations in speed due to draw would not have much effect on the power. Apart from receiving their current from the same source, the auxiliary motors have no interconnection. It will be seen that the mechanical part of the drive of the machine is simple and easy to operate while the electrical part of the drive is just the application of a motor to one or all of the sections without electrical complications and does not require highly skilled or expert attention.

Having thus described my invention what I claim is:

1. The combination with power driven main mechanical driving mechanism for a paper making machine of an auxiliary electric motor adapted to assist in driving a section of the machine, said electric motor being coupled to and controlled by the mechanical drive.

2. The combination with power driven main mechanical driving mechanism of a paper making machine of auxiliary electric motors coupled to and controlled by the main driving mechanism and adapted each to assist in driving a section of the machine.

3. The combination with power driven main mechanical driving means for a paper machine of auxiliary electrical driving means, the current supply of which is controlled by the speed of the main driving means.

4. The combination with power driven mechanical driving means coupled to all sections of a paper making machine, of auxiliary electrical driving elements each coupled to the main drive and adapted to assist in driving a section of the machine and means controlled by the speed of the main driving means to regulate the current supply to the auxiliary driving elements.

5. The combination with main power driven mechanical driving means for operating a plurality of sections of a paper making machine, of auxiliary electrical driving elements each coupled to the main driving means and adapted to assist in driving one section of the machine, current supply means for said auxiliary driving elements, said current supply means being controlled by the speed of the main driving means.

6. The combination with power driven main driving mechanism for a paper making machine adapted to drive a plurality of sections thereof, of auxiliary electric motors, each coupled to the main driving mechanism and adapted to drive a section of the machine, a generator adapted to supply current to the electric motors and means controlled by the speed of the main driving mechanism to control the current supply from the generator to the auxiliary motors.

7. The combination with a paper making machine having mechanical driving means adapted to drive a plurality of sections thereof, of a plurality of auxiliary motors each coupled to the mechanical driving means and adapted to assist in driving one section of the machine, a motor generator set adapted to supply electrical current to the auxiliary motors, and means controlled by the speed of the mechanical driving means to regulate the voltage supply to the auxiliary motors.

In witness whereof, I have hereunto set my hand.

BERNARD A. MALKIN.